(12) United States Patent
Berkenhoff et al.

(10) Patent No.: US 8,596,577 B2
(45) Date of Patent: Dec. 3, 2013

(54) APPARATUS FOR CLOSING A LOCKER, WHICH CAN BE LOWERED, OF A BAGGAGE COMPARTMENT

(75) Inventors: Johannes Berkenhoff, Warthausen (DE); Oleg Graf, Illertissen (DE)

(73) Assignee: Diehl Aircabin GmbH, Laupheim (DE)

( * ) Notice: Subject to any disclaimer, the term of this patent is extended or adjusted under 35 U.S.C. 154(b) by 420 days.

(21) Appl. No.: 12/960,924

(22) Filed: Dec. 6, 2010

(65) Prior Publication Data

US 2011/0133029 A1 Jun. 9, 2011

(30) Foreign Application Priority Data

Dec. 4, 2009 (DE) .......................... 10 2009 057 014

(51) Int. Cl.
*B64C 1/22* (2006.01)

(52) U.S. Cl.
USPC .................................... 244/118.1; 244/118.5

(58) Field of Classification Search
USPC .......... 244/118.1, 118.5, 129.4, 129.5, 129.1, 244/18.1; 312/319.2, 319.5, 319.8
See application file for complete search history.

(56) References Cited

U.S. PATENT DOCUMENTS

| | | | | |
|---|---|---|---|---|
| 2,947,533 | A * | 8/1960 | Brumby et al. ................... | 49/253 |
| 4,123,013 | A * | 10/1978 | Bottrill et al. ................... | 242/372 |
| 4,729,490 | A | 3/1988 | Ziegenbein | |
| 6,045,204 | A * | 4/2000 | Frazier et al. ................... | 312/247 |
| 6,484,969 | B2 * | 11/2002 | Sprenger et al. ............ | 244/118.5 |
| 6,598,829 | B2 * | 7/2003 | Kamstra ..................... | 244/118.1 |
| 6,691,951 | B2 * | 2/2004 | Frazier ......................... | 244/118.1 |
| 7,246,771 | B2 | 7/2007 | Wisch et al. | |
| 7,270,297 | B2 * | 9/2007 | Schaefer et al. ............ | 244/137.1 |
| 7,481,397 | B2 | 1/2009 | Steinbeck et al. | |
| 7,887,008 | B2 * | 2/2011 | Lamoree et al. ............ | 244/118.1 |
| 7,988,091 | B2 * | 8/2011 | Wieding et al. ............ | 244/118.5 |
| 8,028,957 | B2 * | 10/2011 | Wolf et al. ................. | 244/118.5 |
| 2002/0175244 | A1 * | 11/2002 | Burrows et al. ............ | 244/118.1 |
| 2003/0080247 | A1 * | 5/2003 | Frazier ...................... | 244/118.1 |
| 2004/0140398 | A1 * | 7/2004 | Lau et al. .................. | 244/118.1 |
| 2005/0211834 | A1 * | 9/2005 | Wisch et al. ............... | 244/118.5 |
| 2005/0218264 | A1 * | 10/2005 | Graf et al. ................. | 244/118.1 |
| 2005/0224643 | A1 * | 10/2005 | Graf et al. ................. | 244/118.1 |
| 2005/0230541 | A1 * | 10/2005 | Graf et al. ................. | 244/118.5 |
| 2007/0095980 | A1 * | 5/2007 | Bock .......................... | 244/118.1 |
| 2007/0095981 | A1 * | 5/2007 | Bock .......................... | 244/118.1 |

(Continued)

FOREIGN PATENT DOCUMENTS

| | | |
|---|---|---|
| DE | 103 61 830 A1 | 8/2005 |
| DE | 102004049700 B4 | 10/2007 |
| DE | 102007003363 A1 | 7/2008 |
| WO | WO 95/18040 A1 | 7/1995 |

*Primary Examiner* — Christopher P Ellis
*Assistant Examiner* — Medhat Badawi
(74) *Attorney, Agent, or Firm* — Scully, Scott, Murphy & Presser, P.C.

(57) ABSTRACT

An apparatus for closing a locker, which can be lowered, of a baggage compartment, in particular of an overhead baggage compartment in an aircraft, wherein the locker is connected in an actuating element (5) which is held on a frame (1) such that it can rotate or pivot, and is connected to a gas compression spring (18) in order to assist a closing movement of the locker. In order to allow a completely automatic closing movement, the invention proposes that an electromechanical hybrid drive is provided in order to drive the actuating element (5) and, in addition to the mechanical component of the gas compression spring (18), has an electrical drive apparatus (12) as an electrical component.

28 Claims, 2 Drawing Sheets

(56) References Cited

U.S. PATENT DOCUMENTS

| | | | |
|---|---|---|---|
| 2008/0035794 A1* | 2/2008 | Steinbeck et al. | 244/131 |
| 2008/0073462 A1* | 3/2008 | Wolf et al. | 244/118.1 |
| 2008/0078868 A1* | 4/2008 | Lamoree et al. | 244/118.1 |
| 2008/0078869 A1* | 4/2008 | Kneller et al. | 244/118.5 |
| 2008/0078870 A1* | 4/2008 | Kneller et al. | 244/118.5 |
| 2008/0078871 A1* | 4/2008 | Munson et al. | 244/118.5 |
| 2008/0191093 A1* | 8/2008 | Benkart et al. | 244/118.1 |
| 2008/0277527 A1* | 11/2008 | Fokken et al. | 244/118.1 |
| 2008/0295407 A1* | 12/2008 | Von Wieding et al. | 49/199 |

* cited by examiner

APPARATUS FOR CLOSING A LOCKER, WHICH CAN BE LOWERED, OF A BAGGAGE COMPARTMENT

BACKGROUND OF THE INVENTION

The invention relates to an apparatus for closing a locker, which can be lowered, of a baggage compartment, in particular of an overhead baggage compartment in an aircraft.

DISCUSSION OF THE PRIOR ART

A distinction can be drawn between two types of baggage compartments, in particular in aircraft. A first type relates to so-called "fixed baggage compartments", which have a fixed shelf and a flap which is provided on their front face. In order to stow baggage, the flap is opened, and is then closed again. A second type of baggage compartment relates to so-called "movable baggage compartments", which have a locker which can be lowered. The baggage compartment is opened by lowering the locker, and its loading edge is lowered at the same time. Movable baggage compartments are therefore more convenient. When loading a locker with a relatively high load, however, a relatively large amount of force must be applied in order to close a movable baggage compartment such as this.

In order to assist the closing movement of a locker of a movable baggage compartment, it is known from DE 10 2004 049 700 B4 and from DE 10 2007 003 363 A1 for the locker to be connected to an actuating element which is held on a frame such that it can rotate or pivot and is connected to a gas compression spring in order to assist a closing movement. The locker is normally connected to the actuating element via a linkage or a cable. A restoring force from the gas compression spring may be adjustable as a function of the load held in the locker. The known apparatuses make it easier to close the locker manually. When loading the locker with a heavy load, a certain amount of force still has to be applied, however, in order to close the baggage compartment. Particularly in the case of passenger aircraft with a high passenger capacity, this can lead to undesirable delays for entry and exit.

In order to overcome this disadvantage, US 2008/0078871 A1 discloses an apparatus by means of which the locker of an overhead baggage compartment can be opened and closed by an electrical drive apparatus. There is no longer any need to apply manual force, in particular in order to close the locker. However, the electrical drive apparatus requires considerable power in order to close the locker. When loading a passenger aircraft, it can be assumed that a multiplicity of lockers are closed at the same time or in a relatively short time window. The power required to do this cannot be provided by the aircraft on-board power supply system.

SUMMARY OF THE INVENTION

The object of the invention is to overcome the disadvantages of the prior art. One particular aim is to specify an apparatus by means of which the locker of a baggage compartment can be closed essentially without applying any manual force. A further aim of the invention in this case is to consume as little electrical energy as possible from an on-board power supply system.

According to the invention, an electromechanical hybrid drive is provided in order to drive the actuating element and, in addition to the mechanical component of the gas compression spring, has an electrical drive apparatus as an electrical component.

The proposed combination of a gas compression spring and a hybrid drive, which comprises an electrical drive apparatus, as proposed according to the invention makes it possible to completely close the locker without applying any significant manual force. The electrical power which is drawn in this case from the on-board power supply system can be reduced considerably by the interaction with the gas compression spring according to the prior art. Even when a multiplicity of lockers are closed at the same time, the electrical power which is required for this purpose can be provided by a generator for the on-board power supply system in a passenger aircraft.

One advantageous refinement provides that a restoring force which is produced by the gas compression spring corresponds to 0.3 to 0.7 times, preferably 0.4 to 0.6 times, a permissible load weight of the locker. Preferably a gas compression spring is used which produces a restoring force which corresponds to approximately half the permissible load weight of the locker. For example, if the permissible load weight of the locker is 50 kg and the locker is loaded with a load weight of, for example 25 kg, this can be closed substantially by the influence of the gas compression spring. Only friction forces need be overcome by the electrical drive apparatus. This does not require a particularly large amount of power from the electrical on-board power supply system.

In a further advantageous refinement, the electrical drive apparatus is connected to an electrical energy store in order to supply electrical power. Expediently, the electrical energy store is in turn connected to the on-board power supply system, in order to recharge it with electric current. The electrical energy store is advantageously formed from a plurality of capacitors. The provision of the electrical energy store makes it possible to draw the energy which is required to drive the electrical drive apparatus from the on-board power supply system with a time offset, in particular over a relatively long time period, and then to make it available to the electrical drive apparatus, without any additional load on the on-board power supply system, during the process of closing the locker. Particularly in the case of passenger aircrafts with a high passenger capacity, this allows a multiplicity of lockers loaded with a high load weight to be closed at the same time without this placing any particular load on, or even overloading, the on-board power supply system. The proposed apparatus is particularly highly operationally reliable.

In a further advantageous refinement, the electrical drive apparatus has an electric motor which is provided with a gearbox, preferably an epicyclic gearbox. An electrical drive apparatus such as this is particularly physically compact.

The actuating element may be a winding disc for winding up and unwinding a cable. The term "cable" is understood in the context of the present invention to be a flexible tensioning element. In this case, it may also be a belt, a chain or the like. The actuating element may, of course, also be designed in some other way. For example, it may be an actuating arm which can pivot and is connected, for example, to a linkage or else to a cable, in order to move the locker.

In a further advantageous refinement, a drive shaft of the electrical drive apparatus is connected via a further gearbox, preferably a bevel tooth system to a drive disc which is connected to the winding disc. Furthermore, a linear movement element, for example a pushrod or a sleeve of the gas compression spring is provided with a toothed rod which engages in a toothed crown which is provided on the drive disc. This means that, for drive purposes, the drive disc is connected both to the electrical drive apparatus and to the gas compression spring.

According to a further advantageous refinement, the drive disc is connected to the winding disc via a torsion spring. Furthermore, the drive disc engages in a driver cam, which is provided on the winding disc, such that rotation of the drive disc in one direction drives the winding disc while, in contrast, rotation of the winding disc in the opposite direction is possible only against the restoring force of the torsion spring. The proposed refinement contributes to the cable which is held on the winding disc being kept stressed at all times in the event of an intrinsically impermissible manual closure attempt.

In a further advantageous refinement, a control device is provided for controlling the electrical drive apparatus, and is provided with a load sensor for measurement of a load held in the locker. The control device makes it possible, in particular, to start up the electrical drive device as a function of the load held when the load which is held in the locker can no longer be raised by the restoring force produced by the gas spring.

According to a further advantageous refinement, the controller has a manually operable switching device for selective opening and closing of the locker. The switching device is expediently fitted to the locker. It is therefore particularly easily accessible and can also be operated, in particular, by the on-board personnel from a gangway provided between the seat rows in a passenger aircraft.

According to a further advantageous refinement, if a specified limit load held in the locker is exceeded, the electric motor is used as a generator to recharge the electrical energy store. Particularly when the locker is being opened, it is moved automatically to the completely open position when a limit load, which is defined by the restoring force of the gas spring, is exceeded. During this process, the electric motor is rotated and can be used as a generator to recharge the electrical energy store. This also makes it possible to save the electrical energy required to drive the apparatus, while conserving the electrical energy provided from the on-board power supply system.

According to a further measure of the invention, an aircraft is proposed having at least one overhead baggage compartment, whose locker is connected to an apparatus according to the invention, which apparatus is fitted to a frame structure element. The frame structure element may be a crossmember, a round rib or the like.

BRIEF DESCRIPTION OF THE DRAWINGS

One exemplary embodiment of the invention will be explained in more detail in the following text with reference to the drawing, in which.

DETAILED DESCRIPTION OF THE DRAWINGS

Figure 1:
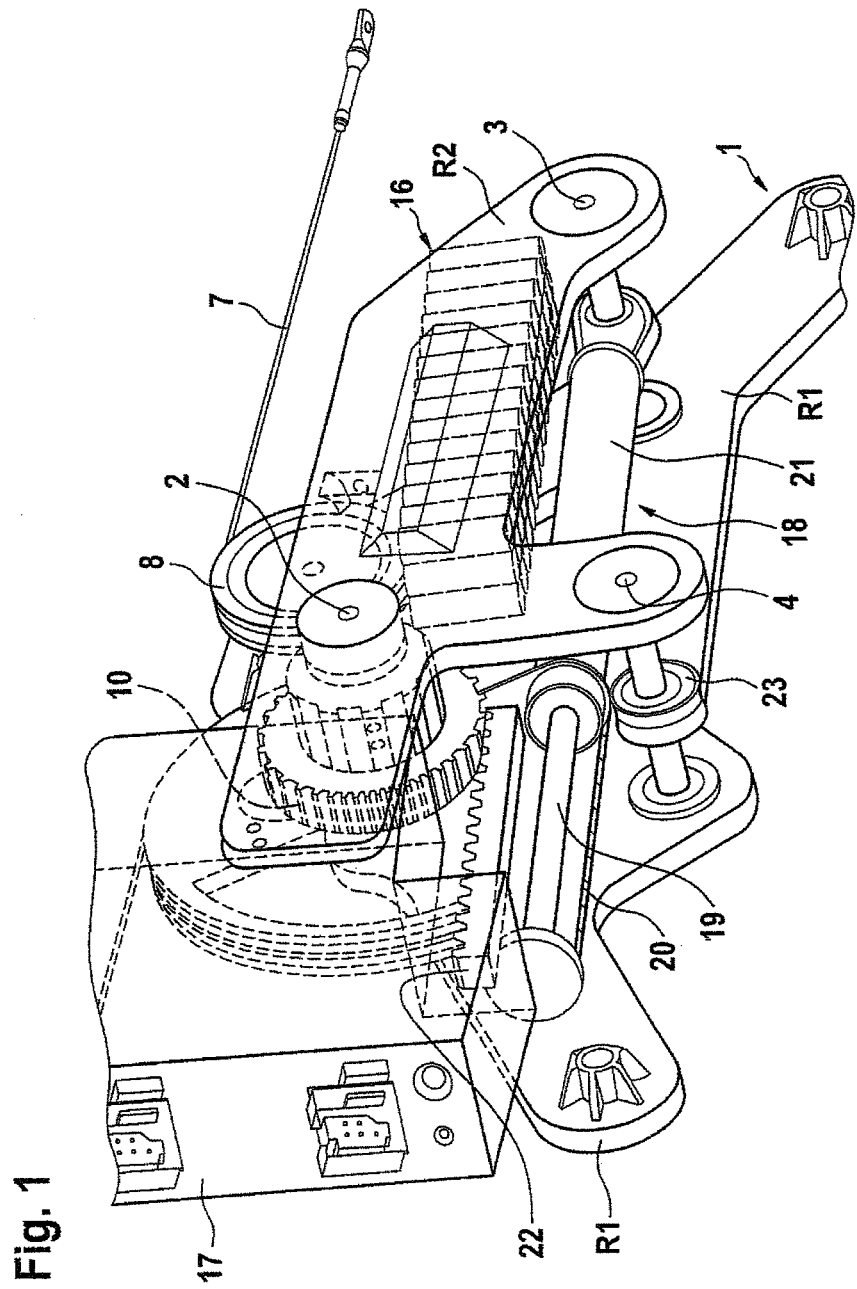
FIG. 1 shows a first perspective view of the apparatus.
Figure 2:
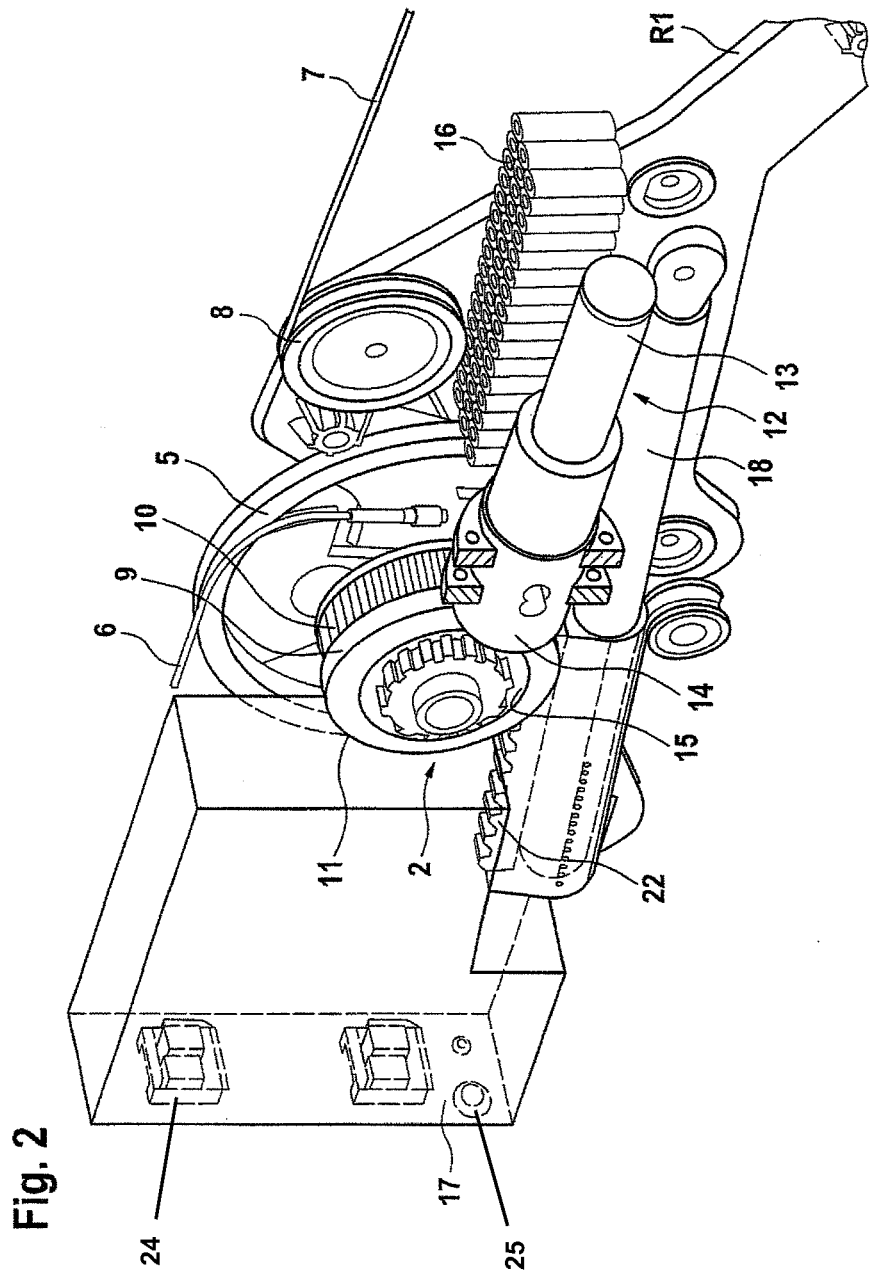
FIG. 2 shows a second perspective partial view of the apparatus shown in FIG. 1.

In FIGS. 1 and 2, the reference symbol 1 in a general form denotes a frame which is formed from two mutually opposite, plate-like frame elements R1, R2. The frame elements R1, R2 are connected to one another by means of a first shaft 2, a second shaft 3 and a third shaft 4. A winding disc 5 is held on the first shaft 2 such that it can rotate, and a first cable 6 and a second cable 7 are held on the winding disc 5, in opposite winding directions. The second cable 7 is passed over a direction-changing roller 8, which is fitted to the frame element R1, such that it is guided approximately in the opposite direction to the first cable 6.

The winding disc 5 is connected to a drive disc 9 which has a tooth system or a toothed crown 10 on its external circumference, and has a first bevel gear 11 on its end face facing away from the winding disc 5.

The reference symbol 12 denotes, in a general form, an electrical drive apparatus which comprises an electric motor 13 with an epicyclic gearbox 14. A second bevel gear 15 is provided on a drive shaft of the electrical drive apparatus 12, and engages in the first bevel gear 11. An electrical energy store, which is formed from a multiplicity of capacitors, is annotated with the reference symbol 16. A control device is indicated schematically by the reference symbol 17.

One end of a gas compression spring 18 is held on the second shaft 3. A pushrod 19 of the gas compression spring 18 is held by its free end at the bottom of a sleeve 20 which can slide on a cylindrical housing 21 of the gas compression spring 18. The sleeve 20 is provided with a toothed rod 22, which engages in the toothed crown 10. The sleeve 20 is also guided on a roller 23, which is held on the third shaft, on the opposite side to the toothed rod 10.

The control device 17 may include a switching device which may, be in the form of two pushbuttons by means of which a locker (which is not shown here) can be moved from a closed position to an open position, and vice versa. A load sensor which is held in the locker (not shown here).

The apparatus operates as follows:

The electrical energy store 16 is charged via an on-board power supply system B with charge control provided in the control device 17. As soon as the switching device produces a command to open the locker, the control device 17 sets the electric motor 13 in motion, with the electrical power in this case being taken from the electrical energy store 16. The locker (not shown here) is opened by the influence of the electric motor 13. In the process, the pushrod 19 is at the same time pushed into the cylindrical housing 21, against a restoring force which is predetermined by the gas compression spring 18.

When the switching device transmits a command to close the locker to the controller 17, then the load held in the locker may first of all be measured by a load sensor. Provided that the load is less than the restoring force produced by the gas compression spring 18, the locker is unlocked, and is closed by the effect of the gas compression spring 18. The electrical drive device 12 is not operated in this case. In this case, the electric motor 13 can be used as a generator to charge the electrical energy store 16.

If the load held in the locker exceeds a limit load, which is defined by the restoring force of the gas compression spring 18, the electric motor 13 is operated when the switching device is operated and a command is thus transmitted to close the locker. Therefore, in this case, the locker is closed by the joint effect of the gas compression spring 18 and that of the electrical drive apparatus 12. The electrical power to operate the electrical drive apparatus 12 for this purpose is taken from the electrical energy store 16.

LIST OF REFERENCE SYMBOLS

1 Frame
2 First shaft
3 Second shaft
4 Third shaft
5 Winding disc
6 First cable
7 Second cable
8 Direction-changing roller
9 Drive disc 10 Toothed crown
11 First bevel gear
12 Electrical drive apparatus
13 Electric motor
14 Epicyclic gearbox
15 Second bevel gear
16 Electrical energy store
17 Control unit
18 Gas compression spring
19 Push rod
20 Sleeve
21 Cylindrical housing
22 Toothed rod
23 Roller
R1, R2 Frame element
B On-board power supply system

What is claimed is:

1. An apparatus for closing a lowerable locker of a baggage compartment in an aircraft, comprising:
   an actuating element, to which the locker is connected, the actuating element being held on a frame such that the actuating element is capable of rotating or pivoting,
   a drive disc connected to the actuating element, the drive disc comprising a toothed crown,
   a gas compression spring, to which the locker is connected to assist a closing movement of the locker, and
   an electrical drive apparatus for driving the actuating element, and
   a linear movement element of the gas compression spring, the linear movement element comprising a toothed rod, the toothed rod being configured to engage the toothed crown of the drive disc.

2. The apparatus according to claim 1, wherein a restoring force produced by the gas compression spring corresponds to 0.3 to 0.7 times of a permissible load weight of the locker.

3. The apparatus according to claim 1, wherein the electrical drive apparatus is connected to an electrical energy store to supply electrical power.

4. The apparatus according to claim 3, wherein the electrical energy store is formed from a plurality of capacitors.

5. The apparatus according to claim 1, wherein the electrical drive apparatus comprises an electric motor which comprises a gearbox.

6. The apparatus according to claim 1, wherein the actuating element comprises a winding disc for winding up and unwinding at least one cable.

7. The apparatus according to claim 5, wherein the electrical drive apparatus comprises a drive shaft, wherein the drive shaft is connected via a bevel tooth system to the drive disc.

8. The apparatus according to claim 1, further comprising a control device for controlling the electrical drive apparatus, the control device comprising a load sensor for measurement of a load held in the locker.

9. The apparatus according to claim 8, wherein the control device comprises a manually operable switching device for selectively opening and closing the locker.

10. The apparatus according to claim 9, wherein the switching device is fitted to the locker.

11. The apparatus according to claim 3, wherein, if a predetermined limit load held in the locker is exceeded, the electric motor takes electrical power from the electrical energy store.

12. An aircraft having at least one overhead baggage compartment, whose locker is connected to an apparatus according to claim 1, which apparatus is fitted to a frame structure element.

13. The apparatus according to claim 2, wherein the restoring force corresponds to 0.4 to 0.6 times of a permissible load weight of the locker.

14. The apparatus according to claim 5, wherein the gearbox comprises an epicyclic gearbox.

15. An apparatus for closing a lowerable locker of a baggage compartment in an aircraft, comprising:
   an actuating element, to which the locker is connected, the actuating element being held on a frame such that the actuating element is capable of rotating or pivoting,
   a drive disc connected to the actuating element,
   a gas compression spring, to which the locker is connected to assist a closing movement of the locker, and
   an electrical drive apparatus for driving the actuating element, the electrical drive apparatus comprising a drive shaft, wherein the drive shaft is connected via a bevel tooth system to the drive disc.

16. The apparatus according to claim 15, wherein a restoring force produced by the gas compression spring corresponds to 0.3 to 0.7 times of a permissible load weight of the locker.

17. The apparatus according to claim 16, wherein the restoring force corresponds to 0.4 to 0.6 times of a permissible load weight of the locker.

18. The apparatus according to claim 15, wherein the electrical drive apparatus is connected to an electrical energy store to supply electrical power.

19. The apparatus according to claim 17, wherein the electrical energy store is formed from a plurality of capacitors.

20. The apparatus according to claim 19, wherein, if a predetermined limit load held in the locker is exceeded, the electric motor takes electrical power from the electrical energy store.

21. The apparatus according to claim 15, wherein the electrical drive apparatus comprises an electric motor which comprises a gearbox.

22. The apparatus according to claim 21, wherein the gearbox comprises an epicyclic gearbox.

23. The apparatus according to claim 15, wherein the actuating element comprises a winding disc for winding up and unwinding at least one cable.

24. The apparatus according to claim 15, wherein the gas compression spring comprises a linear movement element which comprises a toothed rod, and wherein the drive disc comprises a toothed crown, the toothed rod and the toothed crown being configured to engage each other.

25. The apparatus according to claim 15, further comprising a control device for controlling the electrical drive apparatus, the control device comprising a load sensor for measurement of a load held in the locker.

26. The apparatus according to claim 23, wherein the control device comprises a manually operable switching device for selectively opening and closing the locker.

27. The apparatus according to claim 24, wherein the switching device is fitted to the locker.

28. An aircraft having at least one overhead baggage compartment, whose locker is connected to an apparatus according to claim 15, which apparatus is fitted to a frame structure element.

* * * * *